(12) United States Patent
Quirant et al.

(10) Patent No.: US 10,305,679 B2
(45) Date of Patent: May 28, 2019

(54) METHOD FOR IMPLEMENTING A COMMUNICATION BETWEEN CONTROL UNITS

(71) Applicant: Robert Bosch GmbH, Stuttgart (DE)

(72) Inventors: Werner Quirant, Beilstein (DE); Andreas Soenkens, Remseck Am Neckar (DE); Thomas Kuhn, Heilbronn (DE); Stefan Schneider, Moensheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 121 days.

(21) Appl. No.: 14/705,404

(22) Filed: May 6, 2015

(65) Prior Publication Data

US 2015/0324576 A1    Nov. 12, 2015

(30) Foreign Application Priority Data

May 12, 2014    (DE) .................. 10 2014 208 855

(51) Int. Cl.

| | |
|---|---|
| *H04L 9/00* | (2006.01) |
| *G06F 21/44* | (2013.01) |
| *H04L 29/06* | (2006.01) |
| *H04L 9/08* | (2006.01) |
| *H04L 9/32* | (2006.01) |

(52) U.S. Cl.
CPC ............ *H04L 9/005* (2013.01); *G06F 21/445* (2013.01); *H04L 9/0877* (2013.01); *H04L 9/0897* (2013.01); *H04L 9/3215* (2013.01); *H04L 9/3234* (2013.01); *H04L 63/0428* (2013.01); *H04L 2209/84* (2013.01)

(58) Field of Classification Search
CPC ...... G06F 21/445; G06F 8/36; H04L 2209/84; H04L 63/0428; H04L 9/005; H04L 9/0866; H04L 9/0877; H04L 9/0897; H04L 9/3215; H04L 9/3234; H04L 9/3278

See application file for complete search history.

(56) References Cited

U.S. PATENT DOCUMENTS

| | | | | |
|---|---|---|---|---|
| 2003/0093684 A1* | 5/2003 | Kaiserswerth | ...... | H04L 63/0428 713/193 |
| 2003/0105537 A1* | 6/2003 | Crispin | ................ | B60W 10/04 700/20 |
| 2006/0069579 A1* | 3/2006 | Grass | ................ | G05B 23/0221 700/90 |
| 2006/0090081 A1* | 4/2006 | Baentsch | ................ | G06F 21/76 713/189 |

(Continued)

FOREIGN PATENT DOCUMENTS

| | | |
|---|---|---|
| CN | 102986203 A | 3/2013 |
| CN | 103069403 A | 4/2013 |
| WO | WO2014055064 | * 10/2012 |

*Primary Examiner* — Joseph P Hirl
*Assistant Examiner* — Sayed Aresh Beheshti Shirazi
(74) *Attorney, Agent, or Firm* — Norton Rose Fulbright US LLP; Gerard Messina

(57) ABSTRACT

A method for implementing a communication between at least two control units, and a control unit interconnection for implementing the method are provided. An electronic hardware security module is provided in each control unit, the communication taking place via an additional communications link.

13 Claims, 4 Drawing Sheets

(56) References Cited

U.S. PATENT DOCUMENTS

| | | | | |
|---|---|---|---|---|
| 2008/0192929 | A1* | 8/2008 | Knechtel | G06F 21/602 380/44 |
| 2010/0141389 | A1* | 6/2010 | Hagl | G06K 19/0707 340/10.1 |
| 2013/0117578 | A1* | 5/2013 | Ihle | G06F 12/1425 713/193 |
| 2013/0185812 | A1* | 7/2013 | Lie | G06F 9/45558 726/29 |
| 2013/0227339 | A1* | 8/2013 | Lund | G06F 11/2023 714/4.11 |
| 2013/0284289 | A1* | 10/2013 | Block | F15B 1/027 137/544 |
| 2014/0229064 | A1* | 8/2014 | Arnold | B60W 50/023 701/41 |
| 2014/0301550 | A1* | 10/2014 | Lewis | H04L 9/0825 380/259 |
| 2014/0304511 | A1* | 10/2014 | Lewis | G09C 1/00 713/170 |
| 2014/0334568 | A1* | 11/2014 | Gotou | H04L 27/10 375/271 |
| 2015/0254677 | A1* | 9/2015 | Huxham | G06K 19/0709 705/57 |
| 2015/0323919 | A1* | 11/2015 | Schwepp | G05B 19/048 700/275 |
| 2016/0191303 | A1* | 6/2016 | Kontz | H04L 45/28 370/217 |
| 2016/0255065 | A1* | 9/2016 | Oshida | H04L 61/6022 726/3 |
| 2017/0026187 | A1* | 1/2017 | Ramatchandirane | H04L 9/3268 |

* cited by examiner

METHOD FOR IMPLEMENTING A COMMUNICATION BETWEEN CONTROL UNITS

CROSS REFERENCE TO RELATED APPLICATION

The present application claims priority to Application No. DE 10 2014 208 855.0, filed in the Federal Republic of Germany on May 12, 2014, which is incorporated herein in its entirety by reference thereto.

FIELD OF INVENTION

The present invention relates to a method for implementing a communication between control units, especially between control units in a motor vehicle; it also relates to a control unit interconnection, a control unit and an electronic hardware security module (HSM).

BACKGROUND INFORMATION

Control units are electronic modules which, for instance, are used in motor vehicles for the control and regulation of functional sequences. For this purpose the control units are assigned to the particular components of the motor vehicle whose operation will be controlled with the aid of the assigned control unit. In order to do so, the control unit reads in data acquired by sensors and influences the operation by controlling actuators.

The described method is used in conjunction with an electronic security module, which is utilized in a control unit, especially in the automotive field, in security-relevant areas. In most applications in the security-relevant areas the manipulation-proof or non-monitorable storing of data is an essential requirement. Cryptographic keys, which are utilized in symmetrical or asymmetrical encryption methods, are used for this purpose.

The employed codes and encryption methods constitute secrets that need to be kept hidden from attackers. Other uses in security-relevant areas, for instance, concern the protection against unauthorized modifications, such as the storing of changed serial numbers or odometer readings, the prevention of unauthorized tuning measures, etc.

Hence it is necessary to provide secure environments in control units, in which functionalities can be executed that must have access to and/or modify these secrets. These environments normally have a secure computer unit or CPU, also referred to as a secure CPU, as well as a storage module. An environment of this type is called a hardware security module (HSM) in this text. It represents a high-performance module, which includes hardware and software components and improves the security and trustworthiness of embedded systems. The HSM in particular helps in protecting security-critical applications and data. The security costs are also able to be reduced by an HSM, while effective protection against attackers is offered at the same time. As far as the basic structure of an HSM is concerned, reference is made to FIG. 3.

It should be noted that the communication of control units in vehicles or in vehicle systems is not carried out in redundant fashion these days and is secured only by way of software plausibility checks. Attacks can therefore be undertaken with little effort and in an uncomplicated manner. For example, Trojans in the control unit are also able to manipulate secure or encrypted communications between control units. As a consequence, there is no redundancy provided in the fault case, and instead only restricted emergency running capabilities are available.

SUMMARY OF THE INVENTION

Against this background, a method having the features described herein, a control unit interconnection as described herein, an electronic hardware security module having the features described herein, and a control unit as described herein are provided. Further refinements can be gathered from the further descriptions herein and the specification.

Thus, a communication takes place via an additionally available communications links. This additionally available communications link is provided in addition to the bus system which connects the control units, especially the main computer units of the control units, to each other. The additionally provided communications link is connected to the electronic hardware security modules (HSM), of which at least one is available in each control unit taking part in the communication, and is developed as a bus system, for instance.

As a result, a second secure communications link is constructed, which has the following tasks:

an authentication between control units, an exchange of critical signals, an exchange of cryptographic keys, enabling an operation under emergency conditions when one or more control unit(s) is/are switched off, missing redundancy and currently weak security are remedied.

The introduced method is based on the introduction of a communications link that is physically separated from the main core or the main computer unit by a hardware security module (HSM). This enables a secure communication with other control units.

For this purpose the HSM is expanded by a communications module, for instance, and only the HSM has access to this module. The communication between the various HSMs can take place via a separate line, which means greater security. The communications module used for implementing the method in the specific development is at least partially integrated into the HSM and cannot be addressed from the outside.

The various control devices are able to authenticate each other via the utilized secure communications link. The authentication may take place a single time when the control unit is programmed, during each driving cycle, or cyclically. Critical signals and cryptographic keys can be exchanged via the secure communications link. In addition, an operation under emergency conditions is able to be ensured via the secure communications link. Furthermore, in the case of a fault of one or multiple control unit(s), alternative measures are able to be implemented via this communications link.

Additional advantages and developments of the present invention derive from the specification and the appended drawing.

It is understood that the features mentioned above and the features yet to be described may be used not only in the individually given combination but in other combinations or in isolation as well, without departing from the scope of the present invention.

SPECIFIC EMBODIMENTS OF THE INVENTION

Figure 1:
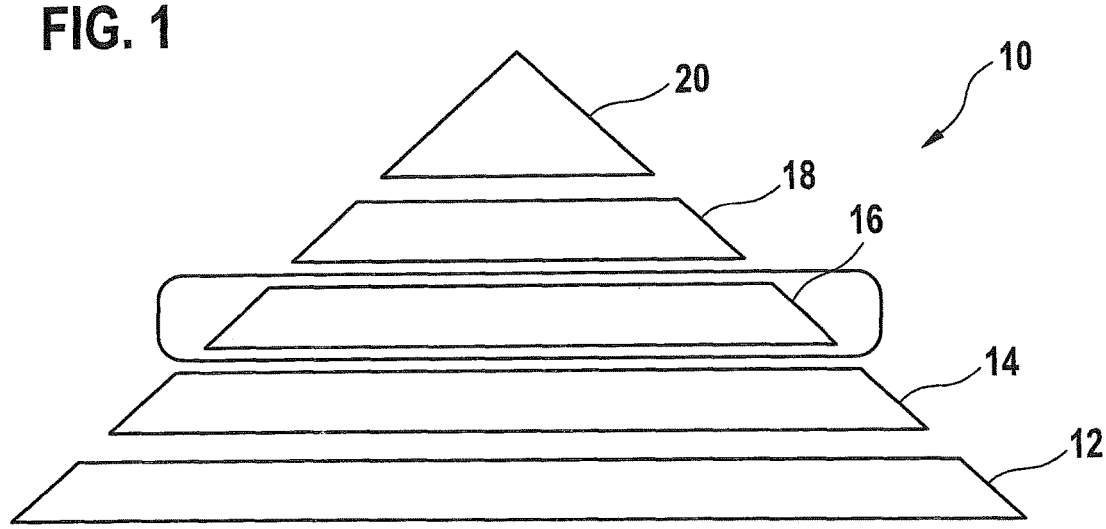
FIG. 1 shows a trust pyramid.

The present invention is represented schematically in the drawing on the basis of specific embodiments and described in detail in the following text with reference to the drawing.

In order to put trust into an IT system that it will always act as expected requires trust in all of the incorporated layers, one after the other, so that a trustworthy IT system is created.

FIG. 1 shows a trust pyramid for a typical IT system. It is provided with reference number 10 overall and includes one layer for organizational security 12, one layer for system security 14, one layer for hardware security 16, one layer for software security 18, and an uppermost layer for trust 20.

Trust in the entire IT system requires that each layer can rely on the effective security of the layer situated underneath, without having the ability to verify this fact independently. For example, this means that it is possible that a perfect software and hardware security solution may turn out to be useless because of a weak security system configuration situated underneath. Moreover, it may be the case that a potential weakness in the system configuration will not be detected or prevented by the upper hardware and software layers.

In contrast to typical back and IT systems, the hardware layer of embedded systems is frequently exposed to physical attacks that influence hardware or software functionalities through a physical arrangement, e.g., manipulate a flash memory or deactivate alarm functionalities. One particular approach for making such physical attacks more difficult is the use of manipulation-proof hardware security modules (HSM), such as those shown in FIG. 2, for instance. Such an HSM protects important information, such as personal identification numbers (PIN), secure keys and critical operations, e.g., a PIN verification and data encryption, for instance by way of strong physical shielding.

The manner in which an HSM may be developed and the kind of functionalities it is able to perform in order to improve the security of an embedded system will be illustrated in the following text.

Figure 2:
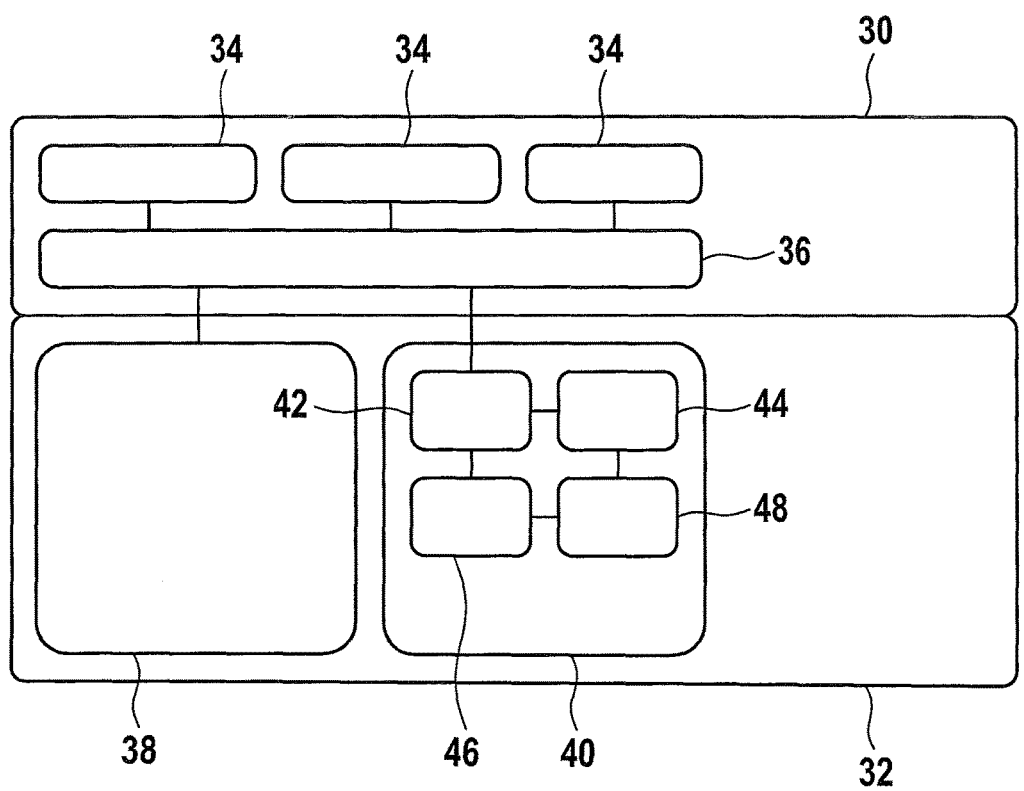
FIG. 2 shows functionalities of an HSM in a schematic representation.

FIG. 2 depicts the core functionalities of a typical hardware security module. The illustration shows a software layer 30 and a hardware layer 32, which is protected against unauthorized access.

Software layer 30 includes a number of applications 34, three of which are shown in this case. An operating system 36 is provided in addition. Hardware layer 32 includes embedded standard hardware 38 and a hardware security module (HSM) 40. A first block 42 in this HSM 40 is provided for interfaces and the control, a second block 44 is provided for secure encryption functionalities, a third block 46 is provided for secure functionalities, and a secure memory 48 is included.

Secure memory 48 is a small, non-volatile data memory, e.g., having a capacity of a few kilobytes, within manipulation-proof HSM 40, so that an unauthorized readout, manipulation or deletion of critical information, e.g., of cryptographic keys, cryptographic certificates or authentication data such as PINs or passwords is prevented. In addition, secure memory 48 of HSM 40 holds all HSM configuration information, e.g., information pertaining to the owner of HSM 40, or access authorizations to secure internal units.

Second block 44 for secure encryption functionalities holds cryptographic algorithms used for data encryption and decoding, such as AES or 3DES, a data integrity amplifier, such as MAC or HMAC, or a data origin verification, e.g., through the use of digital signature algorithms such as RSA or ECC, and all associated cryptographic activities, such as key generation and key verification, for instance.

Secure functionalities in third block 46 include all protected functionalities that are not directly assigned to a cryptographic method, HSM 40 serving as physically protected "trust anchor". For example, this may be a physically protected clock signal, an internal random-number generator, a loading program protective mechanism or some other critical application functionality, such as for realizing a secure dongle.

First block 42 for interfaces and the control includes the internal HSM logic, which implements the HSM communication with the external world and administers the operation of all internal basic components such as the aforementioned ones.

All functional basic components of hardware security module 40, as described above, are surrounded by an uninterrupted physical boundary, which prevents internal data and processes from being monitored, copied or cloned or manipulated. This could enable an unauthorized user to use or compromise internal secrets. The cryptographic boundary is commonly implemented by algorithmic and physical time channel countermeasures with a dedicated access protection arrangement, such as special shielding or layers in order to enable side channel resistance, access information, access resistance or an access response, for instance.

The manner in which HSM 40 is able to improve the security of an embedded product solution will be elucidated in the following text.

HSM 40 protects critical information, e.g., identities, cipher keys or keys, by the physical shield, which cannot be circumvented by software susceptibility.

HSM 40 is able to assist in detecting, weakening or deterring powerful POI attackers (POI=point of interest), by implementing effective side channel resistance and access protection barriers, which, among other things, have severe access restrictions that apply even to authorized users. For example, some information is always held exclusively within HSM 40.

HSM 40 is able to accelerate security mechanisms for which certain acceleration switching circuits are utilized.

The use of HSM 40 makes it possible to reduce security costs by adding highly optimized special switching circuits, for instance for standardized cryptography.

Figure 3:
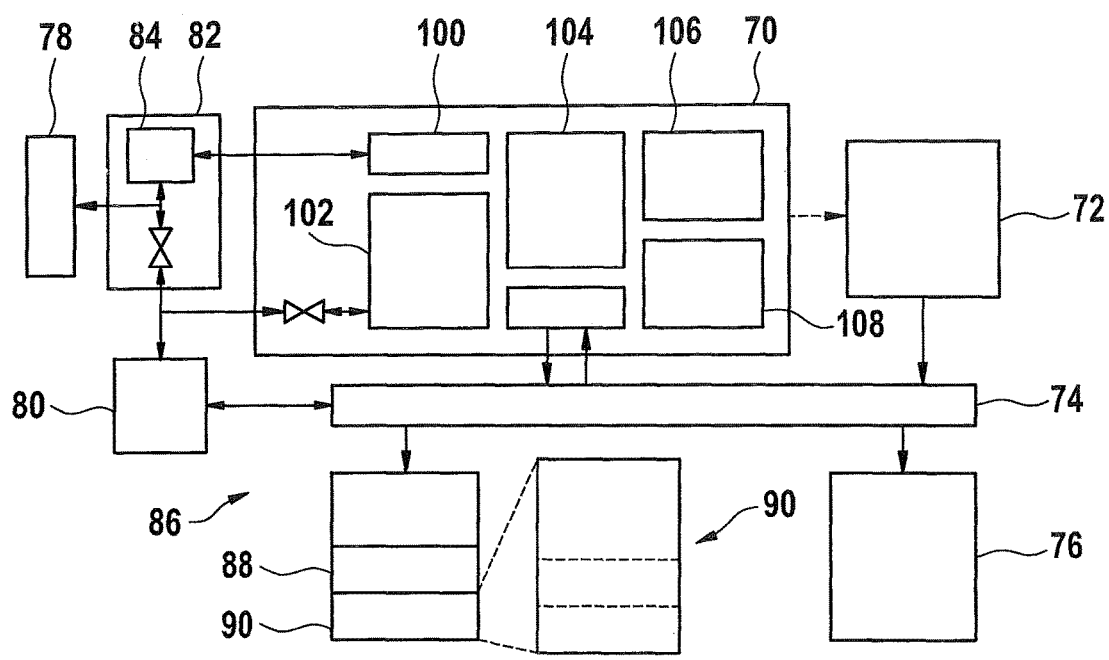
FIG. 3 shows the structure of one specific embodiment of the HSM in a schematic representation.

One possible structure of the HSM is shown in FIG. 3. It shows HSM 70, which is embedded in an environment. The figure shows a main computer unit 72, a system bus 74, a RAM component 76 having an area for joint use, and a test program 78 or debugger including associated hardware 80 and interface 82, which in turn includes a register 84. Moreover, the figure shows a memory component 86 for flash code with a data area 88 and a secure area 90, in which secure core data are contained.

Provided in HSM 70 are an interface 100 to test program 78, a secure computer core 102, a secure RAM component 104, a random-number generator 106, e.g., a TRNG or PRNG, and a key 108, e.g., AES.

Figure 4:
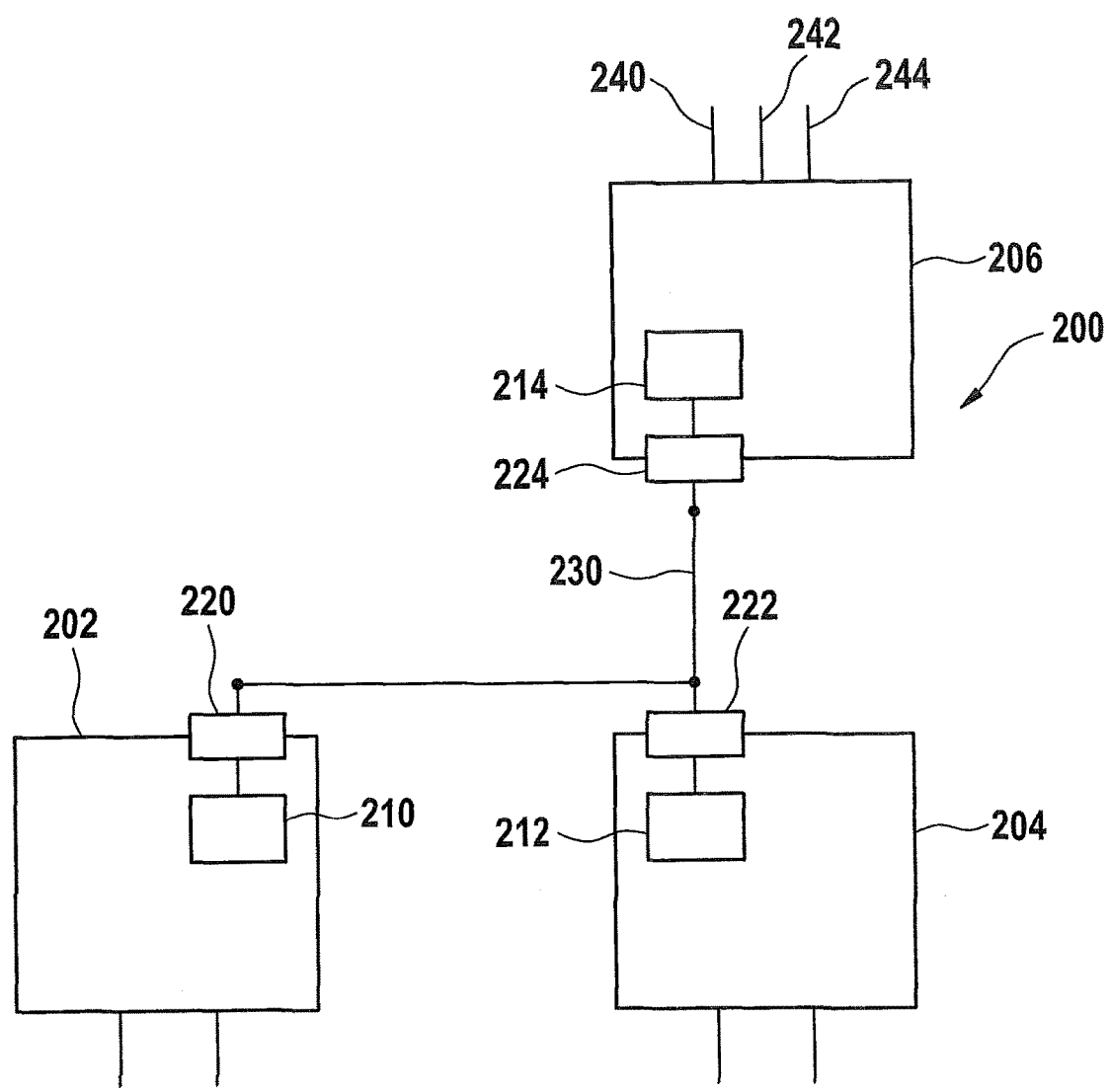
FIG. 4 shows a control unit interconnection.

FIG. 4 shows a control unit interconnection, which is designated by reference numeral 200 overall. This control unit interconnection 200 includes a first control unit 202, a second control unit 204 and a third control unit 206. First control unit 202 is equipped with a first HSM 210; accordingly, second control unit 204 is provided with a second HSM 212, and third control unit 206 with a third HSM 214.

First HSM 210 is assigned a first communication module 220, second HSM 212 is assigned a second communications module 222, and third HSM 214 is assigned a third communications module 224. Using these communications modules 220, 222, 224, which act as interfaces, a communication takes place via an additional bus system 230, which allows a communication between HSMs 210, 212 and 214 and is provided in addition to a bus system (not shown) for the exchange of information between control units 202, 204 and 206. For example, an authentication of control units 202, 204 and 206 takes place via this additional bus system 230. Moreover, an exchange of critical signals such as information pertaining to keys or the keys themselves is able to be realized. Additional bus system 230 also makes it possible to initiate and implement an operation under emergency conditions.

The figure furthermore illustrates on third control unit 206 a CAN interface 240, a LIN interface 242, and an Ethernet interface 244, via which a communication takes place, i.e., on a regular basis independently of the communication via additional bus system 230.

A bus system, which, for instance, operates independently of additional bus system 230 as recited in claim 1, may be connected via these additional interfaces 240, 242 and 244. It is then typically connected to the computer units or main cores of control units 202, 204 and 206.

Figure 5:
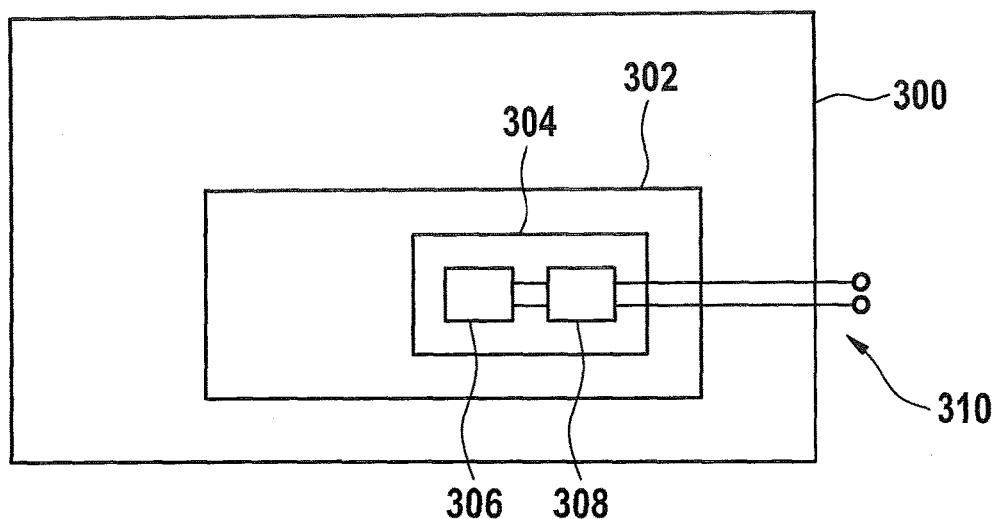
FIG. 5 shows two specific embodiments of the control unit.
Figure 5:
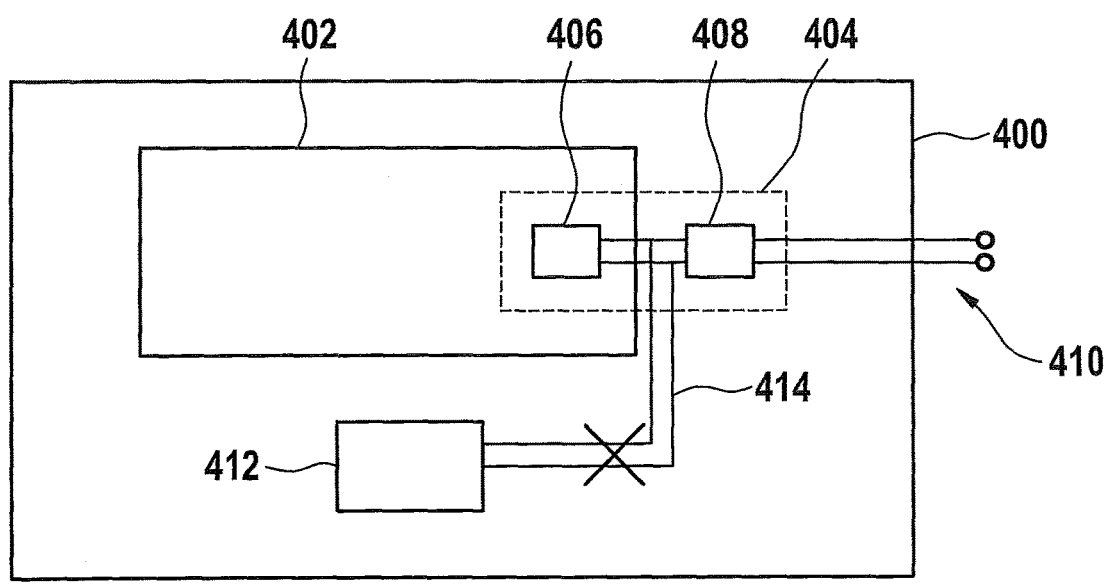

FIG. 5 shows a first control unit 300 and a second control unit 400. An HSM 302, in which a communication module 304 having a controller unit 306 and a transceiver unit 308, is provided, is available in the first control unit. Communications module 304 represents an interface for an additional communications link 310. This additional communications link 310 may be a bus system, such as a CAN bus system. In this case communications module 304 includes a CAN controller and a CAN transceiver. In this particular embodiment of control unit 300, the complete communications module 304 is accommodated inside HSM 302.

Second control unit 400 also includes an HSM 402, a communications module 404 having a controller unit 406 and a transceiver unit 408. Only controller unit 406 is situated inside HSM 402 in this case. Communications module 404 is only partially disposed in HSM 402 and forms an interface to an additional communications link 410.

In addition, the figure shows a main computer unit 412, which has no access to additional communications link 410, as illustrated by the crossed out connections 414.

What is claimed is:

1. A method for implementing a communication between at least two control units, the method comprising:
communicating first data signals between computer units of the at least two control units using first communication modules of the at least two control units via a first bus system, wherein each of the at least two control units includes a respective electronic security module, and
communicating second data signals between the respective electronic hardware security modules of the at least two control units using second communication modules of the at least two control units via an additional bus system physically separate from the first bus system, the respective electronic hardware security modules including physical shielding to prevent monitoring of internal processes, and the respective electronic hardware security modules isolating the additional bus system from the computer units to prevent communication by the computer units via the additional bus system;
wherein each of the respective electronic hardware security modules includes a secure computer core and a secure memory, the secure computer core and the secure memory of each of the respective electronic hardware security modules being surrounded by an uninterrupted physical boundary of the respective electronic hardware security module which prevents internal data and processes from being monitored, copied, cloned, or manipulated, the secure memory of each of the respective electronic hardware security modules storing critical information, the critical information including a cryptographic key, or a cryptographic certificate, or authentication data, and wherein the additional bus system is a secure communication link; and
wherein the communicating of the second data signals between the respective hardware secure modules of the at least two control units via the additional bus includes communicating the critical information between the respective electronic hardware security modules of the at least two control units via the additional bus to implement an authentication of the at least two control units amongst each other.

2. The method of claim 1, wherein the communicating the second data signals is used for implementing an operation under emergency conditions.

3. The method of claim 1, wherein the second communication modules are at least partially contained within the electronic hardware security modules.

4. The method of claim 1, wherein the second communication modules are fully contained within the electronic hardware security modules.

5. The method of claim 1, wherein the communicating the second data signals is implemented to exchange cryptographic keys between the at least two control units.

6. The method of claim 1, wherein the communicating the second data signals is implemented to provide communications redundant to the communicating the first data signals in response to a fault of at least one of the at least two control units.

7. The method of claim 1, wherein communicating the second data signals between the electronic hardware security modules of the at least two control units implements at least one of: an exchange of cryptographic keys between the at least two control units, or operation under emergency conditions.

8. The method of claim 1, wherein the second communication modules each includes a control unit and a transceiver unit, the control unit being contained within the electronic hardware security module.

9. The method of claim 8, wherein the transceiver unit is contained within the electronic hardware security module.

10. A control unit interconnection, comprising:
at least two control units, each having a computer unit, a first communication module, at least one respective electronic hardware security module, and a second communication module associated with the electronic hardware security module, the electronic hardware security module including physical shielding to prevent monitoring of internal processes;

a first bus system, via which the computer units of the at least two control units are connected to and communicate with each other using the first communication modules; and an additional bus system, via which the second communication modules of the at least two control units are connected to and communicate with each other to provide communication between the respective electronic hardware security modules of the at least two control units, the additional bus system being physically separate from the first bus system, and the respective electronic hardware security modules isolating the additional bus system from the computer units to prevent communication by the computer units via the additional bus system;

wherein each of the respective electronic hardware security modules includes a secure computer core and a secure memory, the secure computer core and the secure memory of each of the respective electronic hardware security modules being surrounded by an uninterrupted physical boundary of the respective electronic hardware security module which prevents internal data and processes from being monitored, copied, cloned, or manipulated, the secure memory of each of the respective electronic hardware security modules storing critical information, the critical information including a cryptographic key, or a cryptographic certificate, or authentication data, and wherein the additional bus system is a secure communication link; and wherein the communication between the respective hardware security modules of the at least two control units includes communicating the critical information between the respective electronic hardware security modules of the at least two control units via the additional bus to implement an authentication of the at least two control units amongst each other.

11. An electronic hardware security module for a control unit having a computer unit and a first communication module, the computer unit communicating first data signals to a computer unit of a second control unit via a first bus system and a first communication module of the second control unit, the electronic hardware security module comprising:

a second communication module to communicate second data signals with a corresponding electronic hardware security module of the second control unit via an additional bus system physically separate from the first bus system; and physical shielding to prevent monitoring of internal processes, wherein the electronic hardware security module isolates the additional bus system from the computer unit to prevent communication by the computer unit via the additional bus system;

wherein the electronic hardware security module includes a secure computer core and a secure memory, the secure computer core and the secure memory of the electronic hardware security module being surrounded by an uninterrupted physical boundary of the electronic hardware security module which prevents internal data and processes from being monitored, copied, cloned, or manipulated, the secure memory of the electronic hardware security module storing critical information, the critical information including a cryptographic key, or a cryptographic certificate, or authentication data, and wherein the additional bus system is a secure communication link; and wherein the electronic hardware security module and the corresponding electronic hardware security module of the second control unit communicate the critical information between each other via the additional bus to implement an authentication of the control unit and the second control unit amongst each other.

12. A control unit, comprising:

a computer unit;

a first communication module connected to a first bus system to communicate first data signals from the computer unit to a corresponding first communication module and computer unit of a second control unit via the first bus system; and an electronic hardware security module including a second communication module connected to an additional bus system, physically separate from the first bus system, to communicate second data signals to a corresponding electronic hardware security module of the second control unit via the additional bus system, the electronic hardware security module including physical shielding to prevent monitoring of internal processes, and the electronic hardware security module isolating the additional bus system from the computer unit to prevent communication by the computer unit via the additional bus system;

wherein the electronic hardware security module includes a secure computer core and a secure memory, the secure computer core and the secure memory of the electronic hardware security module being surrounded by an uninterrupted physical boundary of the electronic hardware security module which prevents internal data and processes from being monitored, copied, cloned, or manipulated, the secure memory of the electronic hardware security module storing critical information, the critical information including a cryptographic key, or a cryptographic certificate, or authentication data, and wherein the additional bus system is a secure communication link; and wherein the electronic hardware security module and the corresponding electronic hardware security module of the second control unit communicate the critical information between each other via the additional bus to implement an authentication of the control unit and the second control unit amongst each other.

13. The control unit of claim 12, further comprising additional interfaces.

* * * * *